UNITED STATES PATENT OFFICE.

EDMOND CAMUS, RENÉ DUCHEMIN, AND GASTON CRIQUEBOEUF, OF PARIS, FRANCE.

PREPARATION OF LEAD ACETATE.

1,297,792.  Specification of Letters Patent.  Patented Mar. 18, 1919.

No Drawing.  Application filed October 30, 1917.  Serial No. 199,357.

*To all whom it may concern:*

Be it known that we, EDMOND CAMUS, RENÉ DUCHEMIN, and GASTON CRIQUEBOEUF, chemists, have invented new and useful Improvements in the Preparation of Lead Acetate, which improvements are fully set forth in the following specification.

It is known that ethers are usually saponified by means of the oxids or hydrates of the alkalis and alkaline earths.

According to this invention we employ for the saponification of certain ethers, in place of such oxids, certain metallic oxids, such as PbO, which although it sometimes acts as an acid radical, (sodium plumbite, etc.,) in this particular case may take the place of the alkali.

When lead oxid is thus employed the saponification takes place smoothly and the process can be worked commercially.

The invention is especially applicable to the saponification of ethyl acetate. Acetate of lead is produced with liberation of ethyl alcohol. In this reaction we may employ either litharge derived from metallic lead, or the oxids of lead derived directly from its ores.

In place of ethyl acetate obtained by commencing with free acetic acid, any other ether obtained by the aid of crude pyroligneous acid or any other acetic acid liquors, may be treated.

In the same manner ethyl formates, propionates and butyrates or the same ethers of the homologues of ethyl alcohol prepared in the same manner may also be saponified in the same way.

The reaction is effected in a very simple manner. A mixture of ethyl acetate, for example, water and lead oxid is merely heated slightly to start the reaction which continues without further heating: it may even be necessary to cool the mass toward the close of the operation.

Claim:

The method of preparing lead acetate consisting in subjecting ethyl acetate in presence of water to the action of lead oxid while heating the mixture to start the reaction.

In testimony whereof we have signed this specification in the presence of two subscribing witnesses.

EDMOND CAMUS.
RENÉ DUCHEMIN.
GASTON CRIQUEBOEUF.

Witnesses:
CHAS. P. PRESSLY,
GASTON DE VESTRAL.

Copies of this patent may be obtained for five cents each, by addressing the "Commissioner of Patents, Washington, D. C."